May 26, 1959  P. G. IPSEN ET AL  2,888,094
STRAINER ARRANGEMENT
Filed Jan. 2, 1957

INVENTORS:
PETER G. IPSEN
KENNETH C. COTTON
BY  *Kiess*
THEIR ATTORNEY

United States Patent Office 2,888,094
Patented May 26, 1959

2,888,094

STRAINER ARRANGEMENT

Peter G. Ipsen, Schenectady, and Kenneth C. Cotton, Scotia, N.Y., assignors to General Electric Company, a corporation of New York Application January 2, 1957, Serial No. 632,224

3 Claims. (Cl. 183—41)

The present invention relates to a strainer arrangement, and more particularly to a strainer construction for removing foreign materials from an elastic fluid flowing to an elastic fluid turbine or other consumer device.

In steam turbines, it has been conventional practice to provide strainers for turbine stop valves or the like to prevent foreign materials such as welding beads or welding slag from entering the turbine. The strainers are generally cylindrical and are concentrically disposed within a cylindrical casing chamber to form an annular channel therewith to which elastic fluid to be strained is conducted. The elastic fluid usually flows into the annular channel at high velocity and throws the foreign material back and forth between the casing wall and the strainer until it is worn down to a size small enough to pass through the strainer or it is deposited against a dam member secured to or formed integral with the valve casing opposite the inlet. While this construction is generally satisfactory, it is subject to the disadvantage that after the maximum quantity of foreign material is collected in the portion of the channel adjacent the dam, the additional material is thrown back and forth between the casing and strainer by the high velocity steam until it wears down to such a small size that the particles will then pass through the strainer screen and into the turbine, which obviously is highly undesirable. After a period of time, so many particles wear at the screen that eventually the strainer wire is worn through, and the strainer screen itself passes into the turbine through the holes of the grid member normally provided to support the strainer screen.

Accordingly, it is an object of our invention to provide a device which removes the foreign particles strained by the strainer from the chamber containing the strainer to increase the life of the strainer.

A further object is to provide a novel strainer assembly which facilitates the separation of foreign particles from the motive fluid by preventing the formation of eddies which maintain the dirt in suspension.

Figure 1:
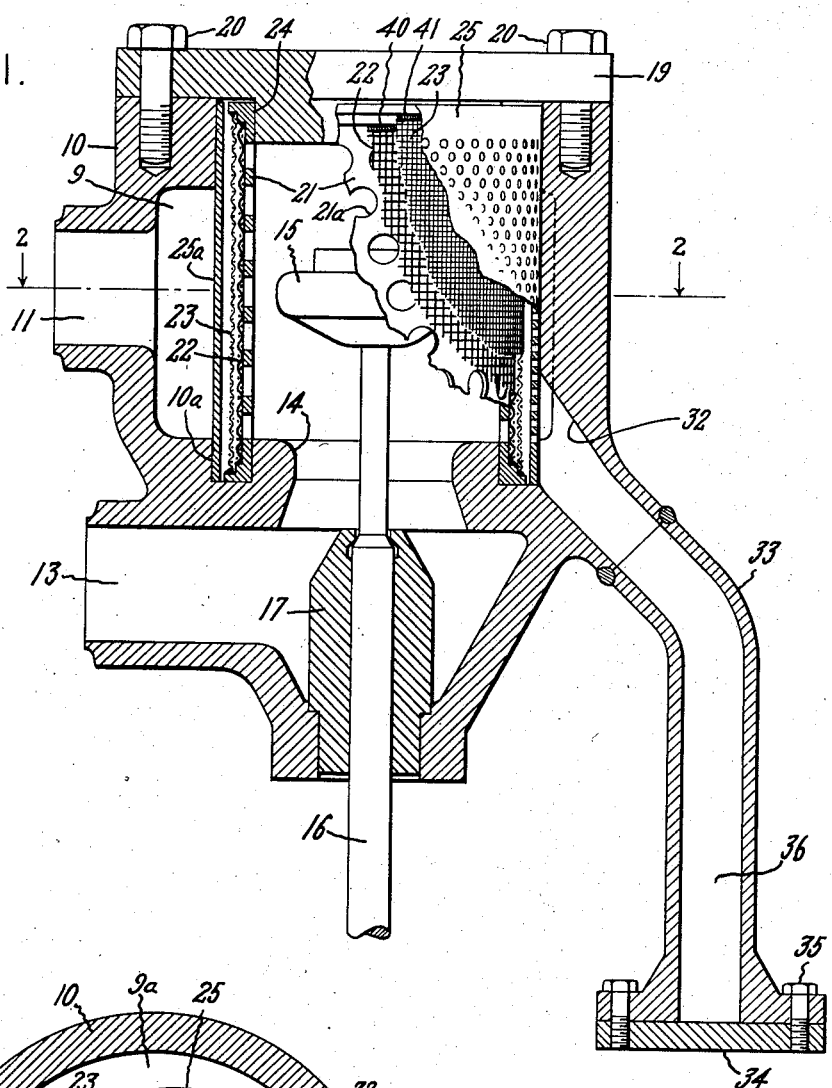
Figure 2:
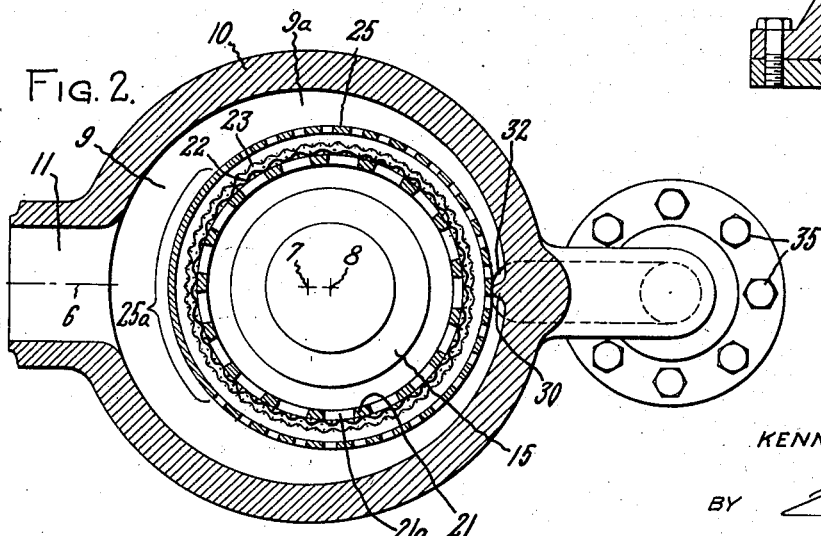

Other objects and advantages will become apparent from the following description taken in connection with the accompanying drawings, in which Fig. 1 is a cross-sectional view of a valve incorporating the novel strainer arrangement; and Fig. 2 is a section taken along lines 2—2 of Fig. 1.

Generally stated, the invention is practiced by providing a cylindrical strainer assembly eccentrically disposed in a cylindrical valve casing chamber to form an annular channel of decreasing cross-sectional area between the inlet and the portion diametrically opposite the inlet to aid in separating the foreign material from the fluid, a dam opposite the casing inlet to collect the foreign material strained from the fluid, and a receptacle adjacent the dam to receive the foreign material deposited adjacent the dam by the high velocity fluid.

Referring to Fig. 1, it is noted that the arrangement comprises a valve body or casing 10 forming an inlet opening 11, an outlet opening 13, and a cylindrical intermediate chamber 9. Chamber 9 is closed at the top by a cover 19 secured to casing 10 by bolts 20. Fluid flow through a valve seat portion 14 disposed intermediate the inlet and outlet openings is controlled by a movable valve disk 15 located in chamber 9. Disk 15 is fastened to a stem 16 which has a lower portion suitably guided in a sleeve 17 held in an extension of the casing 10.

The strainer construction for straining elastic fluid on its path through the valve casing comprises an inner rigid cylinder 21 having a plurality of spaced openings or perforations 21a, a strong coarse wire screen 22, a fine mesh screen 23, and an outer concentric rigid cylinder 25. The screens 22, 23, form the strainer proper and the cylinder 21 forms a backing for the screens to prevent collapsing of the latter due to the pressure drop thereacross. The screens 22, 23 are secured to the cylinder 21 by welds 40, 41 respectively. The purpose of this construction is to permit the use of a fine mesh screen 23 for straining out the very small particles of foreign material while preventing it from being seriously damaged by providing the strong mesh screen 22 and cylinders 21, 25 on opposite sides thereof. The outer "guard cylinder" 25 has many small holes drilled in it and serves to straighten out the flow through the strainer and to help destroy the impact energy of foreign particles before they can reach the screens. It is to be noted that the cylinder 25 has portion 25a adjacent the inlet 11 which is not perforated, so as to protect the screens against the initial high impact energy of the foreign particles in the elastic fluid. The cylinders 21, 25 and screens 22, 23 are secured in place between cover 19 and casing 10 by locating the bottom portions thereof in the annular recess 10a in casing 10 and the top portions in the annular recess 24 formed between the cover 19 and casing 10.

Referring now to Fig. 2, it can be seen that the cylindrical strainer assembly, consisting of the concentrically disposed support cylinder 21, strainer screens 22, 23, and guard cylinder 25, is eccentrically disposed relative to cylindrical chamber 9. The axis 8 of the strainer assembly and the axis 7 of the chamber 9 both intersect, at right angles, the axis 6 of the inlet opening 11, but the strainer assembly is eccentrically disposed relative to the cylindrical chamber by locating the axis 8 of the cylindrical strainer assembly on the side of axis 7 remote from the inlet opening 11. Thus, the strainer assembly and casing 10 form therebetween annular channel 9a consisting of two halves which continuously reduce in cross-sectional area from the front portion of the channel adjacent the inlet 11 to the rear of the channel located substantially diametrically opposite the inlet 11.

Located in the rear portion of the channel, diametrically opposite the inlet 11, is a web or dam 30 secured to or formed integral with the outer casing 10 and projecting inwardly toward the strainer assembly. This dam prevents large pieces of solid matter from passing around the strainer back to the inlet, and serves as a collector for the foreign substances contained in the elastic fluid.

In accordance with our invention, the casing is formed with an opening 32 in the portion of the casing adjacent the bottom of dam 30 into which the foreign material collected by the dam is deposited by gravity. Surrounding this opening and welded to the casing, to serve as a receptacle for the foreign objects and particles dropping into opening 32, is a tube 33 forming a pocket 36 which is closed off at the lower end by a plate 34 which is secured to tube 33 by bolts 35.

The operation of this improved strainer assembly may be outlined as follows. The high velocity elastic fluid flowing from the inlet 11 is divided into two streams flowing through the respective halves of the annular channel 9a. After being deflected by the imperforate portion 25a of guard cylinder 25, the elastic fluid flows through the open portions of the strainer assembly into the interior thereof, whence it is discharged through the outlet 13 with the valve 16 in the open position. The reduction in cross-sectional area of the channels 9a results in an approximately constant fluid velocity all the way back to the dam 30. This approximately constant fluid velocity results from reducing the channel area at a rate corresponding to the reduced volume flow of fluid in the channel which results from the fluid flowing through the strainer to the valve outlet. This provision for substantially constant velocity tends to eliminate the formation of eddies. Thus, the foreign material carried by the elastic fluid first strikes the solid wall portion 25a and then is carried by the elastic fluid in the channel to the dam 30. The substantial elimination of eddies in the channel by maintaining constant velocity reduces the tendency of the foreign material to stay in suspension and thus facilitates the collection of foreign material by the dam. Centrifugal force acting on solid particles entrained in the fluid in channels 9a tends to throw them to the outside wall of the chamber, so that only clean fluid flows inwardly through the perforated guard cylinder 25. It will be seen that centrifugal force also tends to prevent solid particles from impacting and eroding the perforated portions of cylinder 25. The imperforate guard cylinder portion 25a may of course be reinforced by welding on an additional thickness of metal, or by coating with a suitable hard-surfacing material, such as that known to the trade as Haynes "Stellite," in order to increase the life of the cylinder portion subjected to direct impingement by foreign particles.

The foreign material collected by the dam drops out by gravity into the pocket 36. The foreign material can then be removed by merely removing bolts 35 and plate 34. Thus, substantially all the foreign material in the steam is carried to the dam 30 and deposited in pocket 36 out of the chamber 9 where it is not subject to the high steam velocities. Thus, the foreign material cannot be continuously buffeted back and forth between the casing and the strainer until the particles are worn down to a size capable of passing through the screen.

It should be noted that while the eccentric arrangement of the strainer assembly relative to the casing is a preferred construction, it is within the scope of this invention to locate the strainer arrangement concentrically with respect to the cylindrical casing chamber 9, so the substantially constant area of curved passages 9a will result in a progressive drop in fluid velocity from inlet 11 to dam 32. This decrease in velocity reduces the "carrying power" of the fluid, and therefore may increase the tendency of solid particles to settle downwardly by gravity towards the trap opening 32.

Thus, we have provided an improved strainer assembly for removing foreign material from an elastic fluid flowing to an elastic fluid turbine or other consumer device which includes a cylindrical strainer construction disposed eccentrically within a cylindrical casing chamber to form an annular channel in which the foreign material is directed to a dirt collecting dam disposed diametrically opposite the casing inlet, and a receptacle disposed adjacent the dam for receiving the dirt collected by the dam to prevent the foreign material from being pulverized against the strainer arrangement which would tend to reduce the life of the strainer.

It will be obvious to those skilled in the art that changes and substitutions of equivalents might be made without departing from the invention. For example, the plane of the axis of the inlet opening need not be exactly normal of the axis of the strainer assembly and valve opening; and, as noted above, the strainer assembly and casing may be concentric. It is, of course, desired to cover by the appended claims all such modifications as fall within the true spirit and scope of the invention.

What we claim as new and desire to secure by Letters Patent of the United States is:

1. A strainer arrangement for removing solid substances from elastic fluid flowing at high velocity comprising a casing having a first wall defining an inlet, a second wall disposed substantially normal to said first wall and defining an outlet, and an intermediate cylindrical chamber, a cylindrical strainer assembly eccentrically disposed within the cylindrical chamber and surrounding said outlet, the axis of the cylindrical strainer assembly being substantially parallel to the axis of said chamber and disposed on the side of the axis of the cylindrical chamber opposite the inlet to define an annular chamber having two halves for receiving elastic fluid which continuously decrease in cross-sectional flow area from the inlet to the portion of the casing diametrically opposite the inlet, whereby the velocity of the elastic fluid flowing around the strainer is substantially constant to facilitate removal of the solid matter from the elastic fluid by smoothly transporting the solid matter as the fluid flows toward said diametrically opposite portion, and a dam member in the annular chamber secured to the casing and disposed transversely of the fluid stream substantially diametrically opposite the inlet so as to extend to the strainer assembly to collect the solid matter carried through the annular chamber.

2. A device for straining and removing foreign particles from elastic fluid comprising a casing defining a cylindrical chamber, an inlet disposed substantially normal to the axis of the cylindrical chamber, and an outlet opening in one end of the cylindrical chamber, a cylindrical strainer assembly eccentrically disposed within the casing and surrounding the outlet, the axis of the strainer assembly being disposed substantially normal to the inlet and located on the side of the axis of the chamber remote from the inlet to define an annular chamber with the casing having a continuously reducing cross-sectional flow area from the inlet to the portion of the channel diametrically opposite said inlet, whereby the velocity of the elastic fluid flowing in the annular chamber is sustained in order to facilitate the removal of foreign particles by smoothly transporting the foreign particles toward said diametrically opposite portion, a rib in the channel integral with the casing disposed transversely of the fluid stream substantially diametrically opposite the inlet and extending to the strainer assembly to prevent the foreign particles forced into one side of the channel from being carried around to the other side, the casing defining a trap opening adjacent the base of said rib, and a receptacle secured to the casing and communicating with the trap opening for collecting foreign particles impinging against the rib.

3. In a valve comprising a casing having an inlet, an intermediate cylindrical chamber and an outlet from said chamber, a valve seat surrounding said outlet, a valve head adapted to contact said valve seat, a cylindrical strainer assembly eccentrically disposed within the cylindrical chamber surrounding the valve seat to prevent the admission of solid matter through the outlet, the cylindrical strainer and valve outlet being coaxial, the axis of said strainer assembly being substantially normal to the inlet but disposed on the side of the axis of the cylindrical chamber remote from the inlet to define an annular chamber having two halves for receiving an elastic fluid which continuously decrease in cross-sectional flow area from the inlet to the portion of the casing diametrically opposite the inlet, the combination of a dam within the channel substantially diametrically opposite the inlet and extending to the strainer assembly to collect solid particles deposited thereagainst by the high velocity elastic fluid in said semi-annular channels, the casing defining a trap opening communicating with the lower portion of both semi-annular channels at the base of the dam, and a receptacle communicating with said trap opening and secured to the casing for retaining solid matter collected by the dam to thereby remove the solid matter from the fluid stream in the semi-annular channels to prevent solids from being buffeted back and forth between strainer and casing.

References Cited in the file of this patent

UNITED STATES PATENTS

| | | |
|---|---|---|
| 581,912 | Hunt | May 4, 1897 |
| 1,152,831 | Monteagle | Sept. 7, 1915 |
| 1,408,454 | Goosmann | Mar. 7, 1922 |
| 1,805,824 | Hendrickson | May 19, 1931 |
| 2,235,539 | Smith | Mar. 18, 1941 |

FOREIGN PATENTS

| | | |
|---|---|---|
| 279,321 | Great Britain | Oct. 27, 1927 |